United States Patent [19]

Bonfert et al.

[11] Patent Number: 4,919,371
[45] Date of Patent: Apr. 24, 1990

[54] SEALING PASSAGE ARRANGEMENT FOR A PIPELINE

[75] Inventors: Helmut Bonfert, Böblingen; Thomas Hardt, Ostfildern; Rolf Klumpp, Kernen; Wolf-Dietrich Wagner, Stuttgart, all of Fed. Rep. of Germany

[73] Assignee: Daimler-Benz AG, Stuttgart, Fed. Rep. of Germany

[21] Appl. No.: 264,524

[22] Filed: Oct. 31, 1988

[30] Foreign Application Priority Data

Oct. 30, 1987 [DE] Fed. Rep. of Germany ....... 3736778

[51] Int. Cl.$^5$ ................................................ F16L 5/00
[52] U.S. Cl. ..................................... 248/56; 123/90.38
[58] Field of Search ................. 248/56, 51; 123/90.38, 123/90.41, 195 C, 445, 193 H; 277/201; 261/40; 174/65 G

[56] References Cited

U.S. PATENT DOCUMENTS

| 2,534,690 | 12/1950 | Young, Jr. et al. | |
| 3,094,976 | 6/1963 | May | 123/90.38 X |
| 3,194,221 | 7/1965 | Dinger et al. | 123/90.38 X |
| 4,669,443 | 6/1987 | Oetting et al. | 123/195 C X |
| 4,686,946 | 8/1987 | Umeda et al. | 123/90.41 |
| 4,757,789 | 7/1988 | Laine | 123/90.38 X |

FOREIGN PATENT DOCUMENTS

| 183300 | 6/1986 | European Pat. Off. | 248/56 |
| 958671 | 2/1957 | Fed. Rep. of Germany. | |
| 2452854 | 5/1976 | Fed. Rep. of Germany. | |
| 2513394 | 10/1976 | Fed. Rep. of Germany. | |
| 372162 | 9/1983 | Fed. Rep. of Germany. | |
| 3524278 | 1/1987 | Fed. Rep. of Germany. | |

Primary Examiner—J. Franklin Foss
Attorney, Agent, or Firm—Barnes & Thornburg

[57] ABSTRACT

A sealing passage arrangement for a pipeline through a wall aperture in a housing of an internal combustion-engine is disclosed. The sealing passage arrangement is attached so as to be sealed by its housing edge delimiting the open side of the housing on a receiving surface and is constructed so that the disassembly of the housing can be done without previously stripping down the pipeline. A pipe connection is provided inside the housing before the housing is assembled, and an arrangement of the seal element in the wall aperture which can be effected simply, are provided. It is proposed for this purpose to construct the housing aperture extending from the housing edge into the housing wall, to provide in the latter a two-part seal element, to arrange one part of the latter upright on the receiving surface and to bring it into engagement with the other part retained in the edge aperture and to extend the pipeline between the two seal element parts.

6 Claims, 3 Drawing Sheets

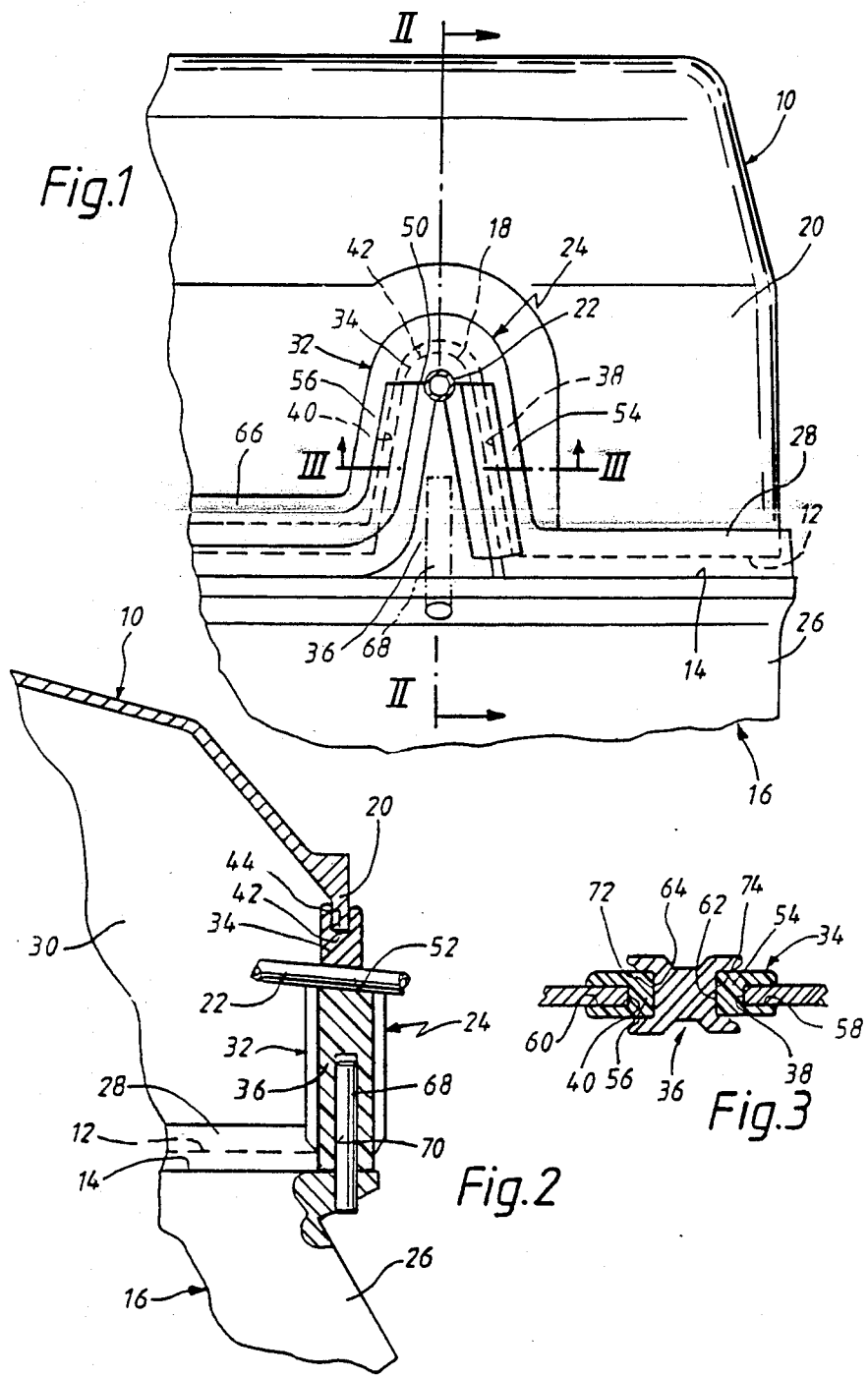

SEALING PASSAGE ARRANGEMENT FOR A PIPELINE

BACKGROUND & SUMMARY OF THE INVENTION

The invention relates to a sealing passage arrangement for a pipeline through a wall aperture in a housing exposed to lubricant medium, said housing being attachable so as to be sealed by a housing edge delimiting the open side of the housing on a receiving surface of an internal-combustion engine, having a seal element made of elastomer material which tightly closes the wall aperture and is penetrated by the pipeline connected inside the housing.

A pipe passage arrangement of this type is known from Austrian Patent Specification No. 372,162. In this construction the wall aperture provided in the housing for the passage of a fuel pipe is constructed as a cylindrical bore. The latter is penetrated by a cap screw receiving the end piece of the fuel pipe which is to be connected inside the housing to a pump-nozzle unit of a fuel-injection internal-combustion engine, for example, which cap screw maintains the tapered end part of the fuel pipe in engagement with a tapered seat of a connecting piece of the pump-nozzle unit.

A bellows seal inserted to form a seal into the wall aperture and enclosing the cap screw to form a seal serves as a seal element for the sealed closure at the wall aperature of the housing space which is generally filled with lubricant medium mist.

This type of pipe passage makes it necessary to equip the housing with a removable cover in order to permit rapid access in case of need to the components accommodated inside the housing, such as the camshaft, its bearings or rocker levers, because otherwise the fuel pipes, a plurality of which are generally provided; have to be demounted to enable the housing to be removed from the cylinder head.

This construction furthermore permits all the fuel pipes to be connected to the individual pump-nozzle units only after the housing has been placed on the cylinder head. Lastly, the assembly of the bellows which have to be attached so as to form a seal in the wall aperture is complicated and time consuming.

It is therefore an underlying object of the invention to provide a sealing pipe passage arrangement which permits a one-part housing construction, the demounting of the housing without stripping down the pipeline, the connection of the latter to the unit before the assembly of the housing, and an easily effected arrangement of the seal element in the wall aperture without additional measures to seal the pipe at the point where it penetrates the seal element.

This object is achieved according to the invention by providing an arrangement wherein the wall aperture starts from the housing edge and extends into the housing wall, wherein the seal element includes a first part and a second part, the first part being retained upright on the receiving surface and being releasably in engagement with the wall aperture which receives the second part, and wherein the two mutually abutting first and second seal element parts enclose the pipeline to form a seal between themselves.

In the construction according to the invention an open-edged wall aperture is provided at the edge of the housing to receive a two-part seal element, one part of the seal element being arranged on the receiving surface of the internal-combustion engine and the other part in the wall aperture. It is therefore possible to connect the pipeline in a space enclosed by the housing even before the housing is assembled. Then during the assembly of the housing the pipeline already fitted and also the part of the seal element provided on the internal-combustion engine come into engagement with the open-edged wall aperture, whereby the wall aperture becomes tightly closed and the pipeline simultaneously becomes clamped to form a seal between the two seal element parts. For purposes of disassembly it is only necessary to release the housing from the internal-combustion engine and lift it off, in which case the seal of the wall aperture is necessarily simultaneously broken again.

In addition to the pipe passage according to Austrian Patent Specification No. 372,162, from which the invention starts, a pipe passage is already known from German Published Unexamined Application No. 3,524,278, which exhibits a seal element for at least one pipeline which is slidable into a wall aperture and encloses the relevant pipeline. In this case, however, the seal element as a whole is engaged in the wall aperture and is slitted along its length for the insertion of the pipeline. There is therefore no tight closure of the housing.

U.S. Patent Specification No. 2,534,690 has as its object in FIG. 7 a pipe passage in which two seal-forming mutually abutting sections of a seal element are already inserted into an open-edged wall recess.

In this case, however, each section receives a pipeline, for which purpose they are slitted, and on the other hand two seal element sections are retained at a distance from the open-edged side of a wall recess by means of a retaining clip in the latter. Therefore, on the one hand, the wall aperture is not closed tightly, and on the other hand, no automatically dividing seal element exists in the case of a housing displacement in the longitudinal direction of the wall recess.

Lastly, German Patent Specification No. 958,671 discloses a tight passage for pipe banks which exhibits a two-part seal element for each pipe, the sections of which can be placed together under pressure and thereby enclose the relevant pipe to form a seal.

Although this construction produces a sealed pipe passage through a housing wall, nevertheless one or more two-part seal elements have to be arranged for this purpose in a tensioning frame, which in turn has to be inserted into a closed-edged wall recess. It is therefore impossible to demount the housing without previously removing the pipe or pipes.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic partial view which shows a front elevation of an end piece of a housing forming a sealing hood mountable on an internal-combustion engine and including a pipe passage arrangement constructed according to a preferred embodiment of the invention;

FIG. 2 is a longitudinal section view taken along the line II—II of FIG. 1 through the pipe passage;

FIG. 3 is a cross-sectional view through the pipe passage, taken along the line III—III of FIG. 1;

DETAILED DESCRIPTION OF THE DRAWINGS

Figure 4:
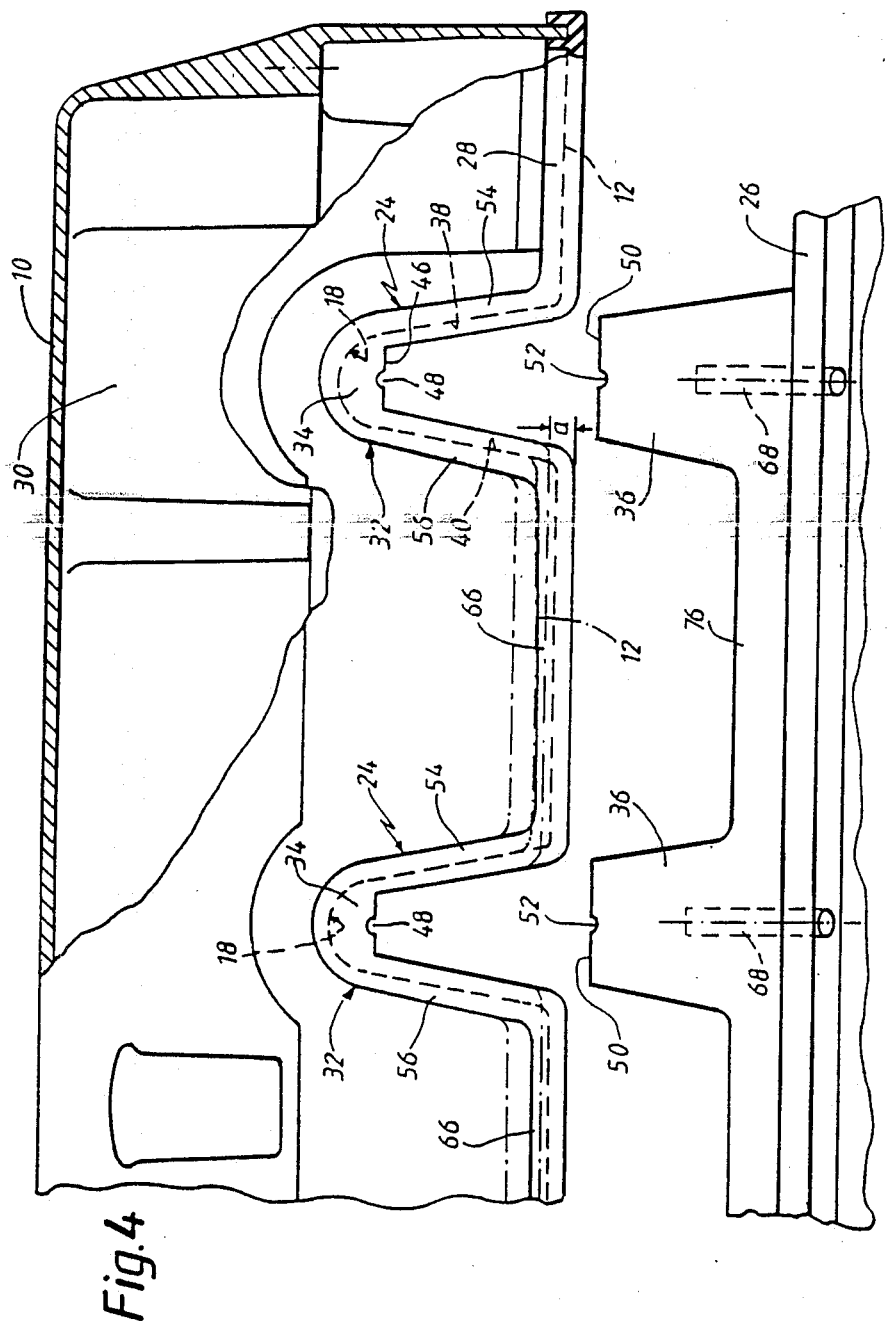
FIG. 4 shows a front elevation of the housing, shown reduced in length, in a position raised from the internal combustion engine.

In FIGS. 1 and 2, 10 designates a one-part housing forming a hood, the housing edge 12 of said housing which delimits the lower open housing side rests so as to be sealed upon a plane receiving surface 14 of an internal-combustion engine 16.

As FIGS. 1 and 2 show, 18 designates a wall aperture which starts from the lower edge 12 of the housing and extends into a side wall 20 of the housing. A pipe line 22 is extended so as to be sealed through this wall aperture 18 by means of a pipe passage generally designated 24 and inserted into the wall aperture 18.

In the illustrated exemplary embodiment the housing 10 forms the cylinder head hood of a cylinder head 26, of the internal-combustion engine 16, whilst the pipeline 22 forms one of a plurality of fuel pipes which are connected inside the cylinder head hood 10, each to a pump-nozzle unit of the internal-combustion engine 16. All the fuel pipes 22 are thereby respectively passed through the respective wall aperture 18 by means of a sealing pipe passage 24.

Figure 5:
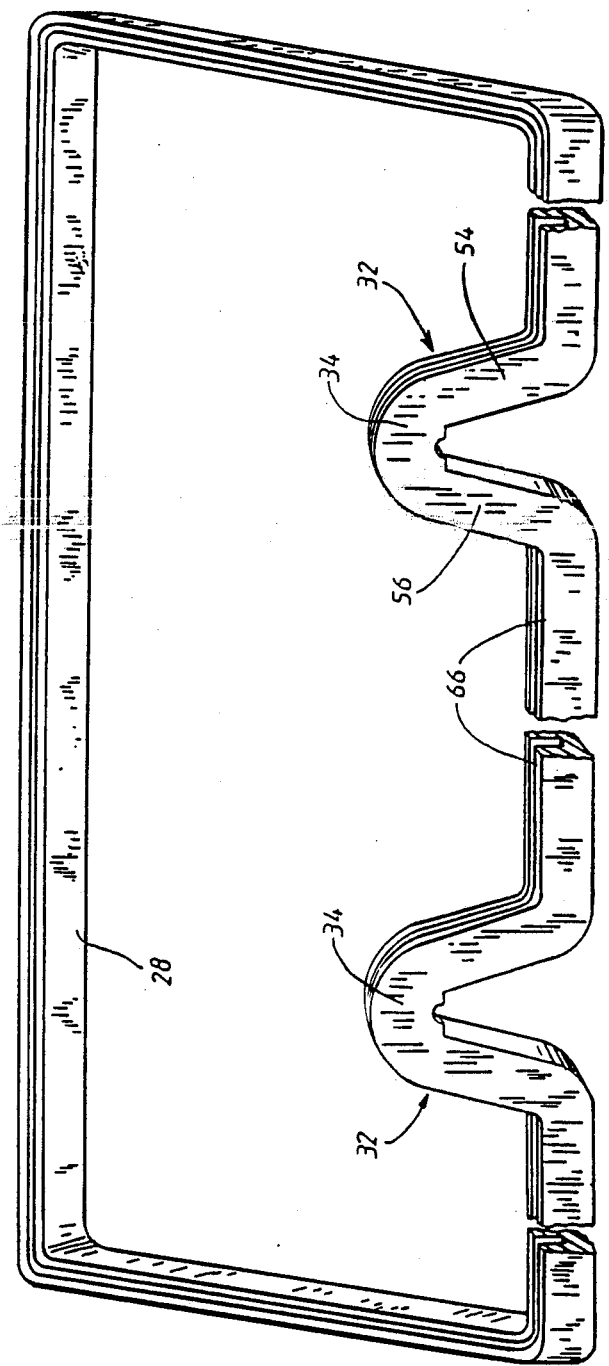
FIG. 5 is a perspective view of a framp-shaped seal for the housing onto which seal elements intended for the engagement in the housing wall apertures are shaped.

The individual pipe passages 24 are structurally identical and are preferably simultaneously integrated into a seal profile 28, frame-shaped according to FIG. 5, which engages over the housing edge 12 and forms a seal present between the cylinder head hood 10 and the receiving surface 14, in order to seal its hood interior 30 which is exposed to lubricant mist.

The pipe passages 24 each exhibit a seal element of two-part construction, generally designated 32, made of elastomer material, preferably rubber, of which one part 34 is inserted into the wall aperture 18 and the other part 36 is retained upright on the receiving surface 14 of the cylinder head 26.

As may be seen from FIGS. 1 and 4, each of the wall apertures 18 is delimited by two straight side edges 38, 40, preferably convergent in a direction opposite to the housing edge 12. The side edges 38, 40 both merge into a common inner, preferably circular arcuate, edge part 42. The parts 34, 36 of the seal element 32 are adapted to this internally upwardly tapering contour of the wall apertures 18, whilst the part 34 on the hood side engages by an external groove 44 (see FIG. 2) over the circular arcuate edge part 42.

This semicircular seal element part 34 exhibits a bracing edge 46 parallel to the receiving surface 14 of the cylinder head 26, which bracing edge is preferably equipped in the center with a depression 48 which receives and encloses fluidtightly one part of the pipeline 22 which is to be sealed.

In a modification of the illustrated embodiment, the construction can be made so that the seal element part 34 ends in the plane of its bracing edge 46 and the other seal element part 36 engages over the side edges 38, 40, each by means of a groove shaped in the longitudinal edges of the latter. In this case it could, corresponding to the construction of the relevant wall aperture 18, tapering upwards in wedge shape, be braced fluidtightly by an upper bracing edge 50 against the bracing edge 46 of the part 34, and at the same time, analogously to the latter, likewise exhibit a semicircular depression 52 enclosing the pipeline 22 to form a seal.

However in the preferred illustrated embodiment seal members 54 and 56 are preferably shaped onto the seal element part 34 for each side edge 38, 40 of the wall aperture 18, being plugged to form a seal on the side edges 38, 40 each by a longitudinal groove 58 or 60. They each exhibit a plane contact surface 62 or 64 on their mutually opposite longitudinal sides.

As may be seen from FIG. 4, the mutually opposite side members 54, 56 of two mutually adjacent wall apertures 18 are mutually connected by a connecting web 66 shaped onto the latter, which in turn, analogously to the seal profile 28, engages around the edge 12 of the cylinder head hood 10 and likewise forms a seal profile.

The seal element part or parts 36 which are aranged standing upright on the receiving surface 14 may be fastened onto the latter individually, preferably by plugging on, which is preferably effected by means of an assembly pin 68 arranged upright in the receiving surface 14, with which a plug-in orifice 70 in the seal element part 36 leading out of its underside may be associated.

As FIG. 3 shows, these seal element parts 36 are equipped at each of their longitudinal edges with an engaging groove 72 or 74, with which the seal members 54 and 56 of the seal element part 34 are positively engaged. This results in an absolutely tight housing closure in the region of the pipe passage as soon as the wall apertures 18 delimited laterally by the seal members 54, 56 are brought into engagement with the seal element parts 36 (see FIGS. 1 and 2).

As FIG. 5 shows, the seal elements 32 in combination with the connecting web 66 and with the seal profile 28 shaped onto their external seal members 54 and 56 for a self-contained seal, frame-shaped for example, which can be plugged onto the edge 12 of the cylinder head hood 10.

As may be seen from FIGS. 4, a preferred embodiment of the invention may also consist in mutually connecting the seal element parts 36 to be arranged standing upright on the cylinder head 26 by a connecting strip 76. Thus the seal element parts 36, which are generally provided for a fourfold or sixfold arrangement of wall recesses 18 on cylinder head hoods 10, form an integral component which can be assembled correspondingly rapidly on the cylinder head 26. In this case the connecting strip 76 will preferably be constructed so that the connecting web 66 on the hood side comes into engagement therewith to form just as a tight a seal as the seal members 54, 56 with the seal element section 36. However, in this case, as indicated by chain-dotted lines in FIG. 4 on the cylinder head hood 10, the section of the housing edge 12 present between the wall apertures 18, and hence also the connecting web 66, should be set back such a distance "a" that the connecting strip 76 can effect the sealing of the cylinder head hood 10 along this edge section.

Other embodiments are also contemplated where the seal members 54 and 56 exhibit a longitudinal groove into which the longitudinal edges of the seal element section 36 engage positively. This of course also relates to the mutual engagement of connecting web 66 and connecting strip 76. Furthermore, the seal profile 28 could also be shaped onto the external longitudinal edges of the two outer seal element sections 36.

Lastly, a plurality of pipes could also be passed so as to be sealed between the two seal element sections 34 and 36, subject to a corresponding width dimensioning.

The construction of a pipe passage provided on a housing, in multiple arrangement for example, which has been explained permits a one-part construction of the cylinder head hood 10, whereby before the latter is placed upon the cylinder head 26 all the pipelines or fuel pipes can be connected within the region enclosed by the cylinder head hood 10.

A gastight and liquid-tight closure of all the wall apertures, and also a sealed embedding of the pipelines or fuel pipes 22 within the seal element 32 is therefore obtained automatically during the assembly of the cylinder head hood 10.

Nitrile rubber (NBR) is particularly suitable as the material for seal element 32, seal profile 28 as well as connecting web 66 and connecting strip 76, whereby the rubber material for the seal element section or parts 36 to be plugged onto the cylinder head 26 is preferably selected to be harder compared to the seal element section 34 associated with it.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Sealing passage arrangement for a pipeline through a wall aperture in a housing exposed to lubricant medium, said housing being attachable so as to be sealed by a housing edge delimiting an open side of the housing on a receiving surface of an internal combustion engine, having a seal element made of elastomer material which tightly closes the wall aperture and is penetrated by the pipeline connected inside the housing, wherein the wall aperture starts from the housing edge and extends into the housing wall,
   wherein the seal element includes a first part and second part, said first part being retained upright on the receiving surface and being releasably in engagement with the wall aperture which receives the second part,
   wherein the two mutually abutting first and second seal element parts enclose the pipeline to form a seal between themselves,
   wherein side edges of the wall aperture converge in a direction opposite to the housing edge and merge into a circular arcuate edge part, and
   wherein the second part of the seal element exhibits two seal members which are in engagement each with a side edge of the wall aperture on the one hand and each with a longitudinal groove of the first part of the seal element on the other hand.

2. Pipe passage arrangement according to claim 1, wherein the second part of the seal element is in positive engagement with both side edges of the wall aperture and with the circular arcuate edge part of the wall aperture.

3. Pipe passage arrangement according to claim 1, wherein a section of the first seal element part which is anchored on the receiving surface of the internal-combustion engine is connected by a connecting strip to at least one further section of said first seal element part which engages into an adjacent wall aperture and is likewise anchored on the receiving surface.

4. Pipe passage according to claim 3, wherein the connecting strip is in engagement with the connecting web which mutually connects the seal members of the second seal element part inserted into mutually adjacent wall apertures.

5. Sealing passage arrangement for a pipeline through a wall aperture in a housing exposed to lubricant medium, said housing being attachable so as to be sealed by a housing edge delimiting an open side of the housing on a receiving surface of an internal combustion engine, having a seal element made of elastomer material which tightly closes the wall aperture and is penetrated by the pipeline connected inside the housing, wherein the wall aperture starts from the housing edge and extends into the housing wall,
   wherein the seal element includes a first part and second part, said first part being retained upright on the receiving surface and being releasably in engagement with the wall aperture which receives the second part,
   wherein the two mutually abutting first and second seal element parts enclose the pipeline to form a seal between themselves,
   wherein side edges of the wall aperture converge in a direction opposite to the housing edge and merge into a circular arcuate edge part,
   wherein the second part of the seal element exhibits two seal members which are in engagement each with a side edge of the wall aperture on the one hand and each with a longitudinal groove of the first part of the seal element on the other hand, and
   wherein at least one seal member portion of the second seal element part is connected to a seal member portion of the second seal element part which is inserted into an adjacent wall aperture through a connecting web which is in engagement with the housing edge which delimits the housing aperture.

6. Pipe passage arrangement according to claim 5, wherein a seal profile which is in all-round engagement with the housing edge is shaped on the seal member portion of the second seal element part and is mutually connected by the connecting web between adjacent wall apertures.

* * * * *